United States Patent
Satou et al.

(10) Patent No.: US 6,414,946 B1
(45) Date of Patent: *Jul. 2, 2002

(54) ADAPTIVE DOWNLINK TRANSMISSION POWER CONTROL ARBITER

(75) Inventors: Shinichi Satou; Masahiro Nishino, both of Tokyo (JP)

(73) Assignee: OKI Electric Industry Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,715

(22) Filed: Nov. 17, 1998

(30) Foreign Application Priority Data

Nov. 19, 1997 (JP) .............................. 9-334951
Oct. 30, 1998 (JP) ........................... 10-310538

(51) Int. Cl.⁷ .......................... H04Q 7/00; H04Q 7/30; H04Q 7/32
(52) U.S. Cl. ..................... 370/328; 370/252; 370/342; 370/479; 375/130; 375/227; 379/395.01; 455/522
(58) Field of Search ................................ 370/252, 342, 370/913, 328, 329, 335, 441, 479; 375/130, 140, 227; 379/395.01; 455/500, 507, 517, 522

(56) References Cited

U.S. PATENT DOCUMENTS

| | | | |
|---|---|---|---|
| 5,446,756 A | * 8/1995 | Mallinckrodt | 375/200 |
| 5,465,399 A | * 11/1995 | Oberholtzer et al. | 455/69 |
| 5,553,316 A | * 9/1996 | Diepstraten et al. | 455/69 |
| 5,566,165 A | * 10/1996 | Sawahashi et al. | 370/18 |
| 5,603,096 A | * 2/1997 | Gilhousen et al. | 455/69 |
| 5,682,382 A | * 10/1997 | Shepard | 370/342 |
| 5,812,938 A | * 9/1998 | Gilhousen et al. | 455/69 |
| 5,924,015 A | * 7/1999 | Garrison et al. | 455/13.4 |
| 5,924,043 A | * 7/1999 | Takano | 455/522 |
| 5,991,329 A | * 11/1999 | Lomp et al. | 375/200 |
| 6,084,904 A | * 7/2000 | Wang et al. | 375/130 |
| 6,085,108 A | * 7/2000 | Knutsson et al. | 455/522 |
| 6,101,179 A | * 8/2000 | Soliman | 370/342 |
| 6,144,861 A | * 11/2000 | Sundelin et al. | 455/522 |
| 6,259,927 B1 | * 7/2001 | Butovitsch et al. | 455/522 |
| 6,285,887 B1 | * 9/2001 | Mimura | 455/522 |
| 6,339,708 B1 | * 1/2002 | Wang | 455/447 |

* cited by examiner

Primary Examiner—Hassan Kizou
Assistant Examiner—Joe Logsdon
(74) Attorney, Agent, or Firm—Rabin & Berdo, P.C.

(57) ABSTRACT

A transmission power control device is provided for controlling transmission power of a transmission signal, so that interference between transmission signals to a plurality of mobile stations is reduced. The transmission power control device of the present invention comprises a total transmission power monitoring section 1 for monitoring total transmission power being transmitted to a plurality of mobile stations by a base station and outputting a monitor signal, a target total transmission power setting section 2 for calculating a total transmission power value applicable to a base station and outputting a setting signal, an adder 3, a multiplier 4, an adder 5, a delay circuit 6, a limiter 7, a desired SIR setting section 8 and an adder 9.

7 Claims, 7 Drawing Sheets

ADAPTIVE DOWNLINK TRANSMISSION POWER CONTROL ARBITER

BACKGROUND OF THE INVENTION

1. Field of the Invention

The present invention relates to a transmission power control device, and more particularly to a downlink transmission power control device for a mobile communication system using a spread spectrum communication method.

2. Description of the Related Art

A lot of attention is currently being paid to the Code Division Multiple Access (hereinafter referred to as CDMA) method as a multiple access (plural connection) method that enables a plurality of users to communicate at the same time by sharing wireless transmission paths. The CDMA method uses spread spectrum techniques and divides the same frequency band among a plurality of users. In order to increase the subscriber capacity in the CDMA method, it is essential to control transmission power with high precision.

In the CDMA method, the conventional method of controlling downlink transmission power is as described in the following. A desired signal-Interference Power Ratio (hereinafter referred to as SIR) for a receive signal is previously set as a target SIR in a mobile station. A small value of SIR means that the ratio of interference power to the power of a signal itself, is small, while a large value of SIR means that the ratio of interference power to the power of a signal itself is large.

The mobile station monitors the SIR of a received signal and compares a monitored SIR with a target SIR. When the monitored SIR is smaller than the target SIR, the mobile station transmits a transmission power control command to the base station instructing increase of the transmission power. When the monitored SIR is larger than the target SIR, the mobile station transmits a transmission power control command to the base station instructing decrease of the transmission power. The base station modifies the transmission power of a transmission signal to a corresponding mobile stations according to this transmission power control command.

However, if the number of mobile stations associated with a single base station is increased, the SIR of the received signal of each mobile station deteriorates. If the SIR of a monitored receive signal is deteriorated, each mobile station will transmit a transmission power control command to the base station instructing increase of transmission power, based on the target SIR of each mobile station. The base station will then increase the transmission power of the transmission signals for each mobile station. For each mobile station, increase in transmission power of transmission signals to other mobile stations causes further deterioration in the SIR. A mobile station with deteriorated received signal SIR then transmits a transmission power control command to the base station instructing increase of transmission power, based on the target SIR of each mobile station. If this vicious circle is repeated, a point is reached where the transmission power can no longer be increased, and communication quality is degraded.

SUMMARY OF THE INVENTION

An object of the present invention is to provide a transmission power control device that solves the above mentioned problems.

The present invention provides a transmission power control device that achieves the above described object, comprising: a total transmission power monitoring section, for monitoring a first total output power being transmitted by a base station to a plurality of mobile stations, and outputting a monitor signal; a target total transmission power setting section, for calculating a second total transmission power value appropriate for the base station and outputting the power value as a setting signal; and a reference update amount calculating section, for calculating a reference update amount from a difference between the monitored signal and the setting signal, and outputting the reference update amount, wherein an instruction for an update target value of a signal-interference power ratio is sent to the plurality of mobile stations based on the reference update amount.

DETAILED DESCRIPTION OF THE PREFERRED EMBODIMENTS

First Embodiment

Figure 1:
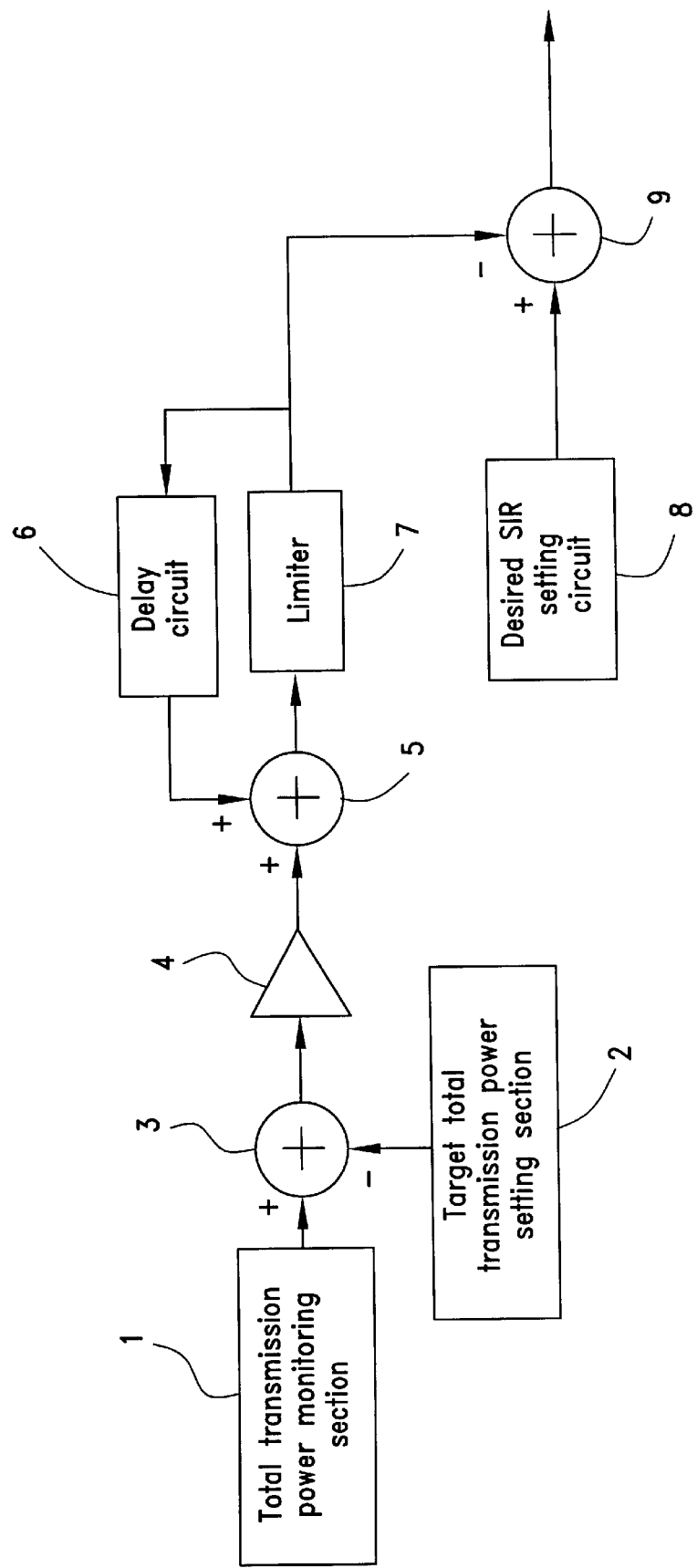
FIG. 1 is a block diagram of a first embodiment of a transmission power control device.

A first embodiment of a transmission power control device will now be described. Specifically, this transmission power control device will be described for a case where it is used as a transmission power control device for a base station A. FIG. 1 is a block diagram of a first embodiment of a transmission power control device. The structure of the transmission power control device of FIG. 1 will first be described.

The transmission power control device comprises a total transmission power monitoring section 1, a target total transmission power setting section 2, an adder 3, a multiplier 4, an adder 5, a delay circuit 6, a limiter 7, a desired SIR setting section 8 and an adder 9.

The total transmission power monitoring section 1 monitors the sum total of transmission power to all mobile stations in the wireless area of the base station A.

A target value of the sum total of transmission power to all mobile devices is previously set inside the target total transmission power setting section 2 as a target total transmission power value. The target total transmission power value is the product of a standard transmission power value and the maximum number of the mobile stations the base station A can permit. The standard transmission power value is the minimum transmission power required for communication between the base station A and mobile stations within the boundary of the wireless area of the base station A. The target total transmission power setting section 2 outputs the target total transmission power value as a setting signal Z.

The multiplier 4 provides an output that is K times the input. If the value of K is large, control of the transmission power control device become fast, whereas if the value of K is small it becomes slow.

The delay circuit 6 is a circuit for outputting, for an input value, the input value one measurement period T before.

The limiter 7 outputs a lower limit value X1 when an input is smaller than a previously set lower limit value X1, outputs an upper limit value X2 when an input is larger than a previously set upper limit value X2, and outputs the input value directly in all other cases.

The desired SIR setting section 8 internally holds a target SIR previously set in the mobile station as a desired SIR, and outputs the desired SIR.

The operation of the transmission power control device shown in FIG. 1 will now be described.

The total transmission power monitoring section 1 monitors the sum total of transmission power to all mobile station within a wireless area of a base station A. The total transmission power monitoring section 1 outputs an average value of the sum total of transmission power to all mobile stations in a measurement period T as a monitor signal Y for every measurement period T.

The target total transmission power setting section 2 outputs a setting signal Z.

The adder 3 subtracts the setting signal Z from the monitor signal Y and outputs the result.

The multiplier 4 multiplies the output of the adder 3 by K and outputs the result at the time t, as a change amount ΔX(t), to the adder 5.

The adder 5 adds together the change amount ΔX(t) and an update amount U(t−T) of one measurement period T before that is output from the delay circuit 6. The addition result is output to the limiter 7 as an accumulative value X(t). The limiter 7 carries out limiting on the accumulative value X to satisfy the following condition:

Lower limit X1 ≦ accumulative value X ≦ upper limit value X2 and supplies output to the adder 9 and the delay circuit 6 as a current update amount U(t).

An update amount U(t) that has been input to the delay circuit 6 is delayed by one measurement period T and output to the adder 5. That is, the update amount U(t) is added to a change amount ΔX(t+T) after one measurement period T by the adder 5 one measurement period T later.

The update amount U(t) that has been input to the adder 9 is subtracted from a desired SIR that has been output from the desired SIR setting section 8. The result of this subtraction is output by the adder 9 as a new target SIR α. The new target SIR α is transmitted to mobile stations in communication with the base station A.

If the transmission power control device of the present invention is used in the base station A, the transmission power for the base station A can be controlled as described in the following. If the sum total of transmission power from the base station to all mobile stations is large, that is, if the monitor signal Y is larger than the setting signal Z, the change amount ΔX becomes larger than 0 and accumulative value X is increased. If the monitor signal Y continues to be larger than the setting signal Z, the accumulative value X exceeds the lower limit X1. In other words, the update value U exceeds the lower limit X1. As a result, the new target SIR becomes a value that is only the update value U subtracted from the desired SIR. The base station transmits the new target SIR to the mobile stations. Since the new target SIR is smaller than the original target SIR, the mobile stations transmit a transmission power control command to the base station A. As a result of this, transmission power from the base station A to the mobile stations is reduced. That is, if the sum total of transmission power from the base station A to all mobile stations is large, the target SIR of the mobile stations is updated so as to reduce this sum total transmission power.

When the transmission power is small, that is, when the monitor signal Y is smaller than the setting signal Z, the change amount ΔX becomes smaller than 0 and accumulative value X is decreased. If the monitor signal Y is smaller than the setting signal Z, that is, if there continues to be a margin in the sum total of the transmission power from the base station to all of the mobile stations, the accumulative value X falls below the lower limit value X1. At this time, an update amount U output from the limiter 7 is equal to the lower limit value X1. Here, the lower limit X1 is set to 0. If the accumulative value X falls below the lower limit value X1, the update amount U output from the limiter 7 becomes the lower limit value X1, namely 0. Accordingly, when there is a margin in the sum total of transmission power from the base station to all of the base stations the target SIR of the mobile stations is not updated.

Second Embodiment

Figure 2:
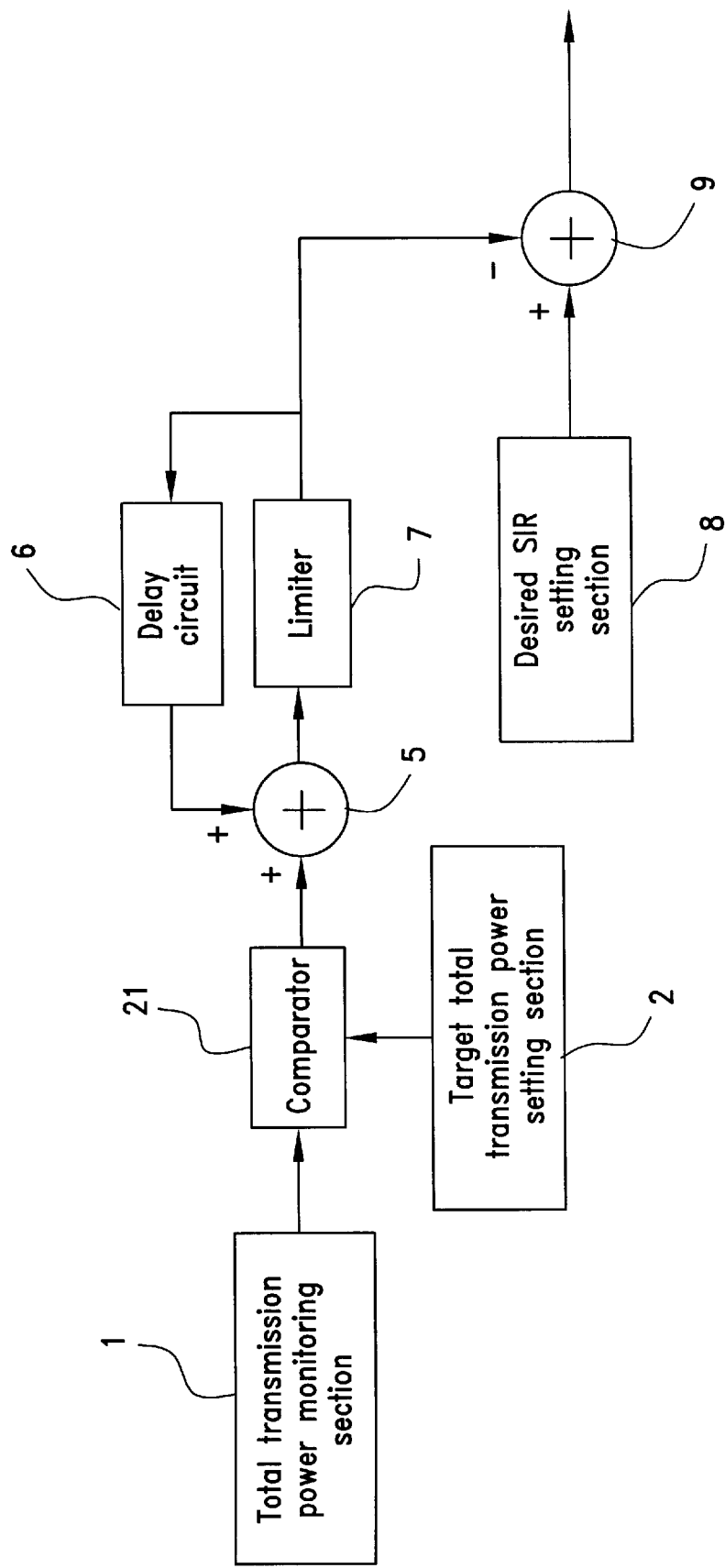
FIG. 2 is a block diagram of a second embodiment of a transmission power control device.

FIG. 2 is a block diagram of a second embodiment of a transmission power control device.

Compared to the transmission power control device of FIG. 1, the transmission power control device of FIG. 2 is provided with a comparator 21 to which the monitor signal and the setting signal Z are input, in place of the adder 3 and the multiplier 4. The comparator 21 has such a function that when the monitor signal Y is larger than the setting signal Z, a fixed positive integer is output as a change amount ΔX(t) for time t, and when the monitor signal Y is less than the setting signal Z, a fixed negative integer is output as the change amount ΔX(t). By changing in this way, rate of increase and decrease in the target SIR is always fixed.

Also, in the transmission power control devices shown in FIG. 1 and FIG. 2, by not transmitting a new target SIR to the mobile stations when the update amount U(t) is 0, it is possible to reduce the amount of data transferred to the mobile stations.

Figure 3:
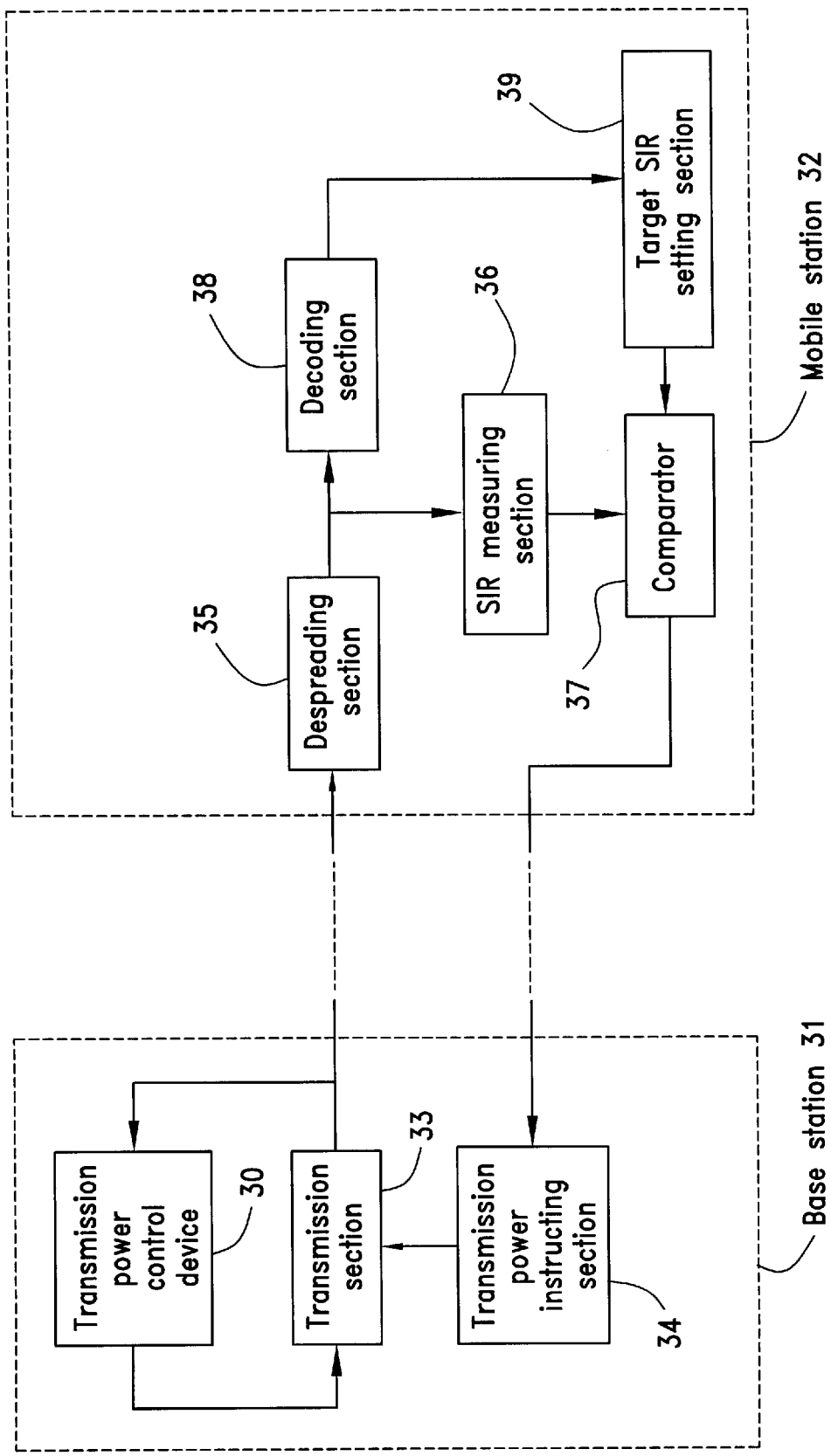
FIG. 3 is a conceptual drawing of a transmission power control system.

FIG. 3 is a conceptual drawing of a transmission power control system.

Control of transmission power between a base station 31 with the transmission power control device of the first or second embodiment and a mobile station 32 within the wireless area of the base station will now be described using FIG. 3.

The parts of the base station 31 relating to the transmission power control system are a transmission power control device 30, of the present invention, a transmitting section 33 and a transmission power instructing section 34. The parts of the mobile station 32 relating to the transmission power control system are a despreading section 35, an SIR measuring section 36, a comparator section 37, a decoding section 38 and a target SIR setting section 39.

The transmitting section 33 subjects a transmission signal to each mobile station to spread spectrum processing, adjusts the transmission power of the spread spectrum signal to each mobile station, and groups the spread spectrum signals to each mobile station together. and transmits them.

The transmission power instructing section 34 instructs the transmission power adjustment for each corresponding mobile station to the transmitting section 33 based on respective transmission power control commands transmitted from each mobile station including the mobile station 32. The transmission power control commands are inserted into transmission power control bits within a frame transmitted from the mobile station 32 to the base station 31, and transmitted.

The despreading section 35 extracts only a signal that has been spread using specified PN code, from spread spectrum signals received by the mobile station 32, and outputs a demodulated signal.

The SIR measuring section 36 measures an SIR of a received spread spectrum signal from the demodulated signal and outputs a received SIR. Specifically, the SIR measuring section 36 calculates a rate of demodulated signal power to demodulated signal amplitude dispersion, and outputs this rate as received SIR.

The decoding section 38 decodes the demodulated signal and outputs a decoded signal.

The target SIR setting section 39 measures a data error rate from the decoded signal. If this error rate is higher than a fixed value, the target SIR setting section 39 updates the target SIR to a value higher than the target SIR at that point in time, while if the error; rate is lower than a fixed value, it updates the target SIR to a value lower than the target SIR at that point in time. At this time, the value of SIR after updating is set such that it does not exceed the target SIR upper limit value retained inside the target SIR setting section 39. Output of the target SIR setting section 39 is the target SIR after updating.

The comparator section 37 compares the received SIR and the target SIR, and if the received SIR is lower than the target SIR, transmits a transmission power control command to the base station 31 instructing increase of transmission power. If the received SIR is higher than the target SIR, the comparator section 37 transmits a transmission power control command to the base station 31 instructing decrease of transmission power.

The operation of the transmission power control system will now be described.

The transmission power control device 30 sets a new target SIR α based on the sum total of transmission power of the spread spectrum signals transmitted by the transmitting section 33. The new target SIR α is input to the transmitting section 33 together with the transmit signals to each mobile station. The transmitting section 33 subjects transmit signals to a spread spectrum technique, and transmits a spread spectrum signal in the direction of each mobile station.

The spread spectrum signal received by a mobile station is despread by the despreading section 35. A demodulated signal is output from the despreading section 35, and this demodulated signal is input to the decoding section 38 and SIR measuring section 36. The decoding section 38 decodes the demodulated signal to output a decoded signal, while the SIR measuring section 36 calculates an SIR of the received spread spectrum signal and outputs the received SIR to the comparator section 37.

The decoded signal is input to the target SIR setting section 39. The target SIR setting section 39 internally sets a new target SIR α included within the decoded signal as an upper limit value of the new target SIR. After that, the target SIR is updated based on a decoded signal error rate and output to the comparator section 37.

The comparator section 37 compares the input target SIR and the received SIR. If the received SIR is a lot larger than the target SIR, the comparator section 37 transmits a transmission power control command instructing decrease of transmission power to the base station 31. If the received SIR is a lot smaller than the target SIR, the comparator section 37 transmits a transmission power control command instructing increase of transmission power to the base station 31.

The transmission power instructing section 34 instructs adjustment of transmission power to corresponding mobile station to the transmitting section 33, based on respective transmission power control commands transmitted from respective mobile stations including the mobile station 32. The transmitting section 33 then adjusts the transmission power of the spread spectrum signals to each of the mobile stations according to the instruction from the transmission power instructing section 34.

If the transmission power control device of the present invention is used, it is possible to thus control the transmission power between a base station and mobile stations within the wireless area of this base station.

Third Embodiment

A third embodiment of a transmission power control device of the present invention will no be described. Compared to the transmission power control device of the first embodiment, the transmission power control device of the third embodiment additionally has the function of taking into consideration the media handled by each mobile station.

Media means the type of data, such as voice data, picture data etc. Desired transmission quality is different depending on the media. The transmission power control device of the third embodiment is characterized by the fact that a new target SIR is calculated for each media. Specifically, description will be given for the case where this transmission power control device is used as a transmission power control device for a base station B, and a separate target SIR is held for each media internally handled by a mobile station inside the wireless area of a base station B. In this description, different media types are indicated with a numeral after the word "media", i.e., media 1, media 2, media 3, etc.

Figure 4:
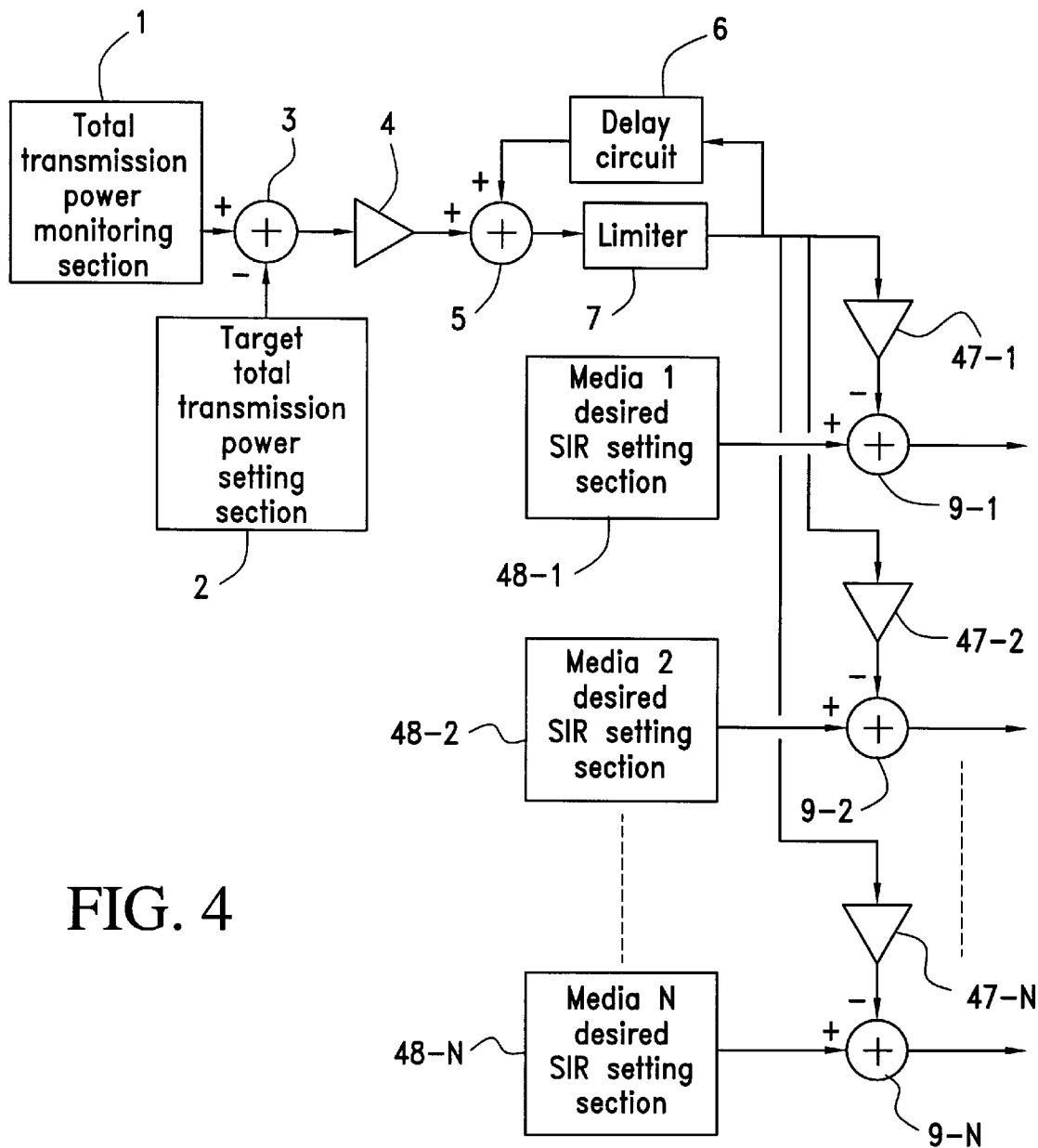
FIG. 4 is a block diagram of a third embodiment of a transmission power control device.

FIG. 4 is a block diagram of a third embodiment of a transmission power control device.

The structure of the transmission power control device of FIG. 4 will now be described.

The transmission power control device comprises a total transmission power monitoring section 1, a target total transmission power setting section 2, an adder 3, a multiplier 4, an adder 5, a delay circuit 6, a limiter 7, multipliers 47-1~47-N, desired SIR setting section for each media, namely media 1 desired SIR setting section 48-1~media N desired SIR setting section 48-N, and adders 9-1~9-N. N is the number of media types. Multiplier 47-k, media k desired SIR setting section 48-k and adder 9-k (k=1~N) are used to calculate a new target SIR αk of media k. In FIG. 4, structural elements that are the same as those described in the first embodiment (FIG. 1) have the same reference numbers attached as are attached in the first embodiment.

The multipliers 47-1~47-N are circuits for multiplying their inputs by coefficients β1~βON respectively internally set, and outputting the result. The coefficients β1~βN are values larger than 0 but smaller than 1. These specific values are set according to the type of media corresponding to each of the multipliers 47-1~47-N. The coefficients β1~βN approach 0 when the degree of importance of the corresponding media type is large, and approach 1 when the degree of importance is small.

Media 1 desired SIR setting section 48-1~media N desired SIR setting section 48-N respectively internally hold SIR values made targets for transmission signals of each media as respective media 1 desired SIR~media N desired SIR, and output these values.

The operation of the transmission power control device shown in FIG. 4 will now be described.

The total transmission power monitoring section 1 monitors the total transmission power to all mobile stations within the wireless area of base station B. The total transmission power monitoring section 1 outputs an average value of the total transmission power in a measurement period T as a monitor signal Y for every measurement period T.

The target total transmission power setting section 2 outputs a total transmission power value that has been previously set internally as a setting signal Z.

The adder 3 subtracts the setting signal Z from the monitor signal Y.

The multiplier 4 multiplies the output of the adder 3 by k times and outputs the result for that time t to the adder 5 as a change amount ΔX(t).

The adder 5 adds together the change amount ΔX(t) and an update amount U(t−T) for one measurement period T previous that is output from the delay circuit 6. The result of addition is output to the limiter 7 as accumulative value X. The limiter 7 carries out limiting on the accumulative value X to satisfy the following condition:

Lower limit X1 ≦ accumulative value X ≦ upper limit value X2 and supplies output to the multipliers 47-1~47-N and delay circuit 6 as a current update amount U(t).

An update amount U(t) that has been input to the delay circuit 6 is delayed by one measurement period T and output to the adder 5. That is, the update amount U(t) is added to a change amount ΔX(t+T) after one measurement period by the adder 5 one measurement period later.

The update amount U(t) input to the multipliers 47-1 47-N is respectively multiplied by β1 times~N times and output. The outputs from the multipliers 47-1~47-N are subtracted from the media 1 SIR~media N SIR by respective adders 9-1~9-N. The subtraction results are respectively output by the adders 9-1~9-N as new target SIR α1~new target SIR αN. New target SIR αX1~new target SIR αN are transmitted to mobile stations currently in communication with base station B.

According to the third embodiment, values subtracted from the media 1 SIR~media N SIR are set smaller for more important media by using the multipliers 47-1~47-N. That is, by not lowering a target SIR for an important media but lowering the target SIR for unimportant media, the transmission quality of important media is maintained.

Figure 5:
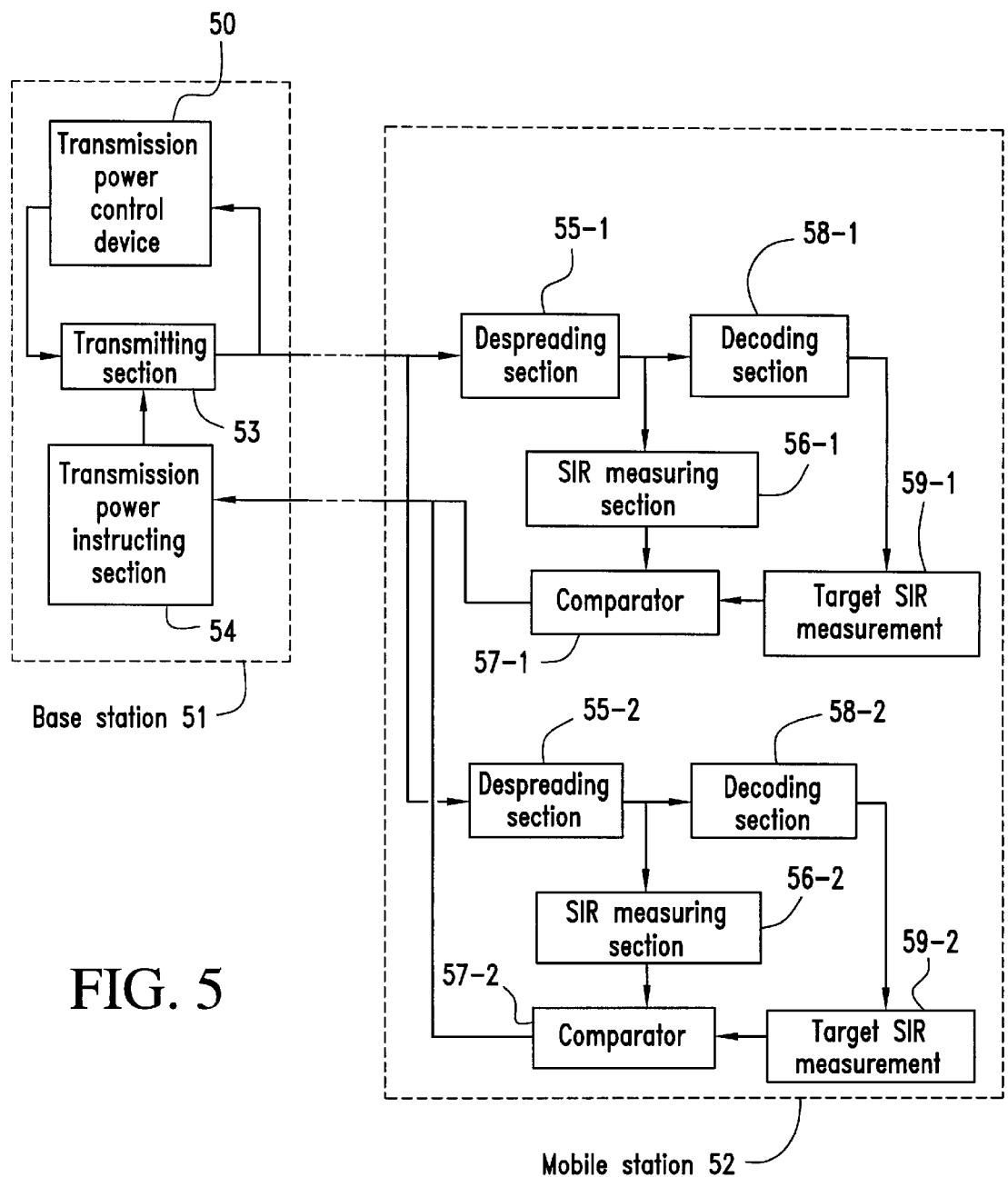
FIG. 5 is a conceptual drawing of a transmission power control system for controlling transmission power separately for types of media.

FIG. 5 is a conceptual drawing of a transmission power control system for controlling transmission power separately for types of media.

Control of transmission power between a base station 51 provided with a transmission power control device of the third embodiment and a mobile station 52 within the wireless area of the base station 51 will now be described using FIG. 5. The mobile station 52 handles two media, namely media 1 and media 2. There are two paths between the base station 51 and the mobile station 52, namely a path for transmission and reception of media 1 signals and a path for the transmission and reception of media 2 signals.

The parts of the base station 51 relating to the transmission power control system are a transmission power control device 50, a transmitting section 53 and a transmission power instructing section 54. The parts of the mobile station 52 relating to the transmission power control system are despreading sections 55-1 and 55-2, SIR measuring sections 56-1 and 56-1, comparator sections 57-1 and 57-2, decoding sections 58-1 and 58-2 and target SIR setting sections 59-1 and 59-2.

The transmitting section 53 subjects transmission signals for separate media to each mobile station to spread spectrum processing, separately adjusts the transmission power of the spread spectrum signals for separate media to each mobile station, and groups the spread spectrum signals for separate media to each mobile station together and transmits them.

The transmission power instructing section 54 separately instructs the transmission power adjustment for respective media signals of each corresponding mobile station to the transmitting section 53 based on respective transmission power control commands of separate media transmitted from each mobile station including the mobile station 52. The transmission power control commands are inserted into transmission power control bits within a frame transmitted from the mobile station 52 to the base station 51, and transmitted.

The despreading section 55-1 extracts only a signal that has been spread using PN code specified by itself and used for media 1, from spread spectrum signals received by the mobile station 52, and outputs a media 1 demodulated signal. The despreading section 55-2 extracts only a signal that has been spread using PN code specified by itself and used for media 2, from spread spectrum signals received by the mobile station 52, and outputs a media 2 demodulated signal.

The SIR measuring section 56-1 measures an SIR of a received media 1 signal from the media 1 demodulated signal and outputs a media received SIR. Specifically, the SIR measuring section 56-1 calculates a rate of media 1 demodulated signal power to media 1 demodulated signal amplitude dispersion, and outputs this rate as a media 1 received SIR.

The SIR measuring section 56-2 measures an SIR of a received media 2 signal from the media 2 demodulated signal and outputs a media received SIR. Specifically, the SIR measuring section 56-2 calculates a rate of media 2 demodulated signal power to media 2 demodulated signal amplitude dispersion, and outputs this rate as a media 2 received SIR.

The decoding sections 58-1 and 58-2 respectively decode the media 1 demodulated signal and the media 2 demodulated signal and output a media 1 decoded signal and a media 2 decoded signal.

The target SIR setting sections 59-1 and 59-2 respectively measure data error rates from the media 1 decoded signal and the media 2 decoded signal. If these error rates are higher than a fixed value, the target SIR setting sections 59-1 and 59-2 update the target SIR to a value higher than the target SIR at that point in time, while if the error rates are lower than a fixed value, they update the target SIR to a value lower than the target SIR at that point in time. At this time, the values of SIR after updating are set such that they do not exceed the target SIR upper limit values retained inside the target SIR setting sections 59-1 and 59-2. The target SIR setting sections 59-1 and 59-2 respectively output the updated target SIRs as a media 1 target SIR and a media 2 target SIR.

The comparator section 57-1 compares the media 1 received SIR and the media 1 target SIR, and if the media-1 received SIR is lower than the media 1 target SIR transmits a transmission power control command to the base station 51 instructing increase of media 1 transmission power. If the media 1 received SIR is higher than the media 1 target SIR, the comparator section 57-1 transmits a transmission power control command to the base station 51 instructing decrease of media 1 transmission power.

The comparator section 57-2 compares the media 2 received SIR and the media 2 target SIR, and if the media 2 received SIR is lower than the media 2 target SIR, transmits a transmission power control command to the base station 51 instructing increase of media 2 transmission power. If the media 2 received SIR is higher than the media 2 target SIR, the comparator section 57-2 transmits a transmission power control command to the base station 51 instructing decrease of media 2 transmission power.

The operation of the transmission power control system of FIG. 5 will now be described.

The transmission power control device 50 sets new target SIRs α1~αN based on the sum total of transmission power of the spread spectrum signals transmitted by the transmitting section 53. The new target SIRs α1~αN are input to the transmitting section 53 as part of respective media transmit signals. The transmitting section 53 subjects transmit signals to a spread spectrum technique, and transmits spread spectrum signals to respective mobile station.

The spread spectrum signals received by a mobile station 52 are despread by the despreading section 55-1 and the despreading section 55-2. A media 1 demodulated signal is output from the despreading section 55-1, and this media 1 demodulated signal is input to the decoding section 58-1 and SIR measuring section 56-1. The decoding section 58-1 decodes the media 1 demodulated signal to output a media 1 decoded signal, while the SIR measuring section 56-1 calculates an SIR of the received media 1 signal and outputs the media 1 received SIR to the comparator section 57-1.

The media 1 decoded signal is input to the target SIR setting section 59-1. The target SIR setting section 59-1 internally sets a new target SIR α included within the media 1 decoded signal as an upper limit value of the new target SIR. After that, the target SIR is updated based on a media 1 decoded signal error rate and output to the comparator section 57-1.

The comparator section 57-1 compares the input media 1 target SIR and the media 1 received SIR. If the media 1 received SIR is a lot larger than the media target SIR, the comparator section 57-1 transmits a transmission power control command instructing decrease of transmission power for media 1 signals transmitted to the base station 52, to the base station 51. If the media 1 received SIR is a lot smaller than the media 1 target SIR, the comparator section 57-1 transmits a transmission power control command instructing increase of transmission power of media 1 signals transmitted to the mobile station 52, to the base station 51.

The transmission power instructing section 54 instructs adjustment of transmission power to each corresponding mobile station to the transmitting section 53, based on respective transmission power control commands transmitted from respective mobile stations including the mobile station 52. The transmitting section 53 then adjusts the transmission power of the spread spectrum signals to each of the mobile stations according to the instruction from the transmission power instructing section 54.

If the transmission power control device of the present invention is used, it is possible to thus control the transmission power between a base station and mobile stations within the wireless area of this base station in media units.

Fourth Embodiment

A fourth embodiment of a transmission power control device of the present invention will now be described.

Compared to the transmission power control device of the third embodiment, in the transmission power control device of the fourth embodiment, a setting signal Z is variable in response to variation in the number of connection circuits.

Figure 6:
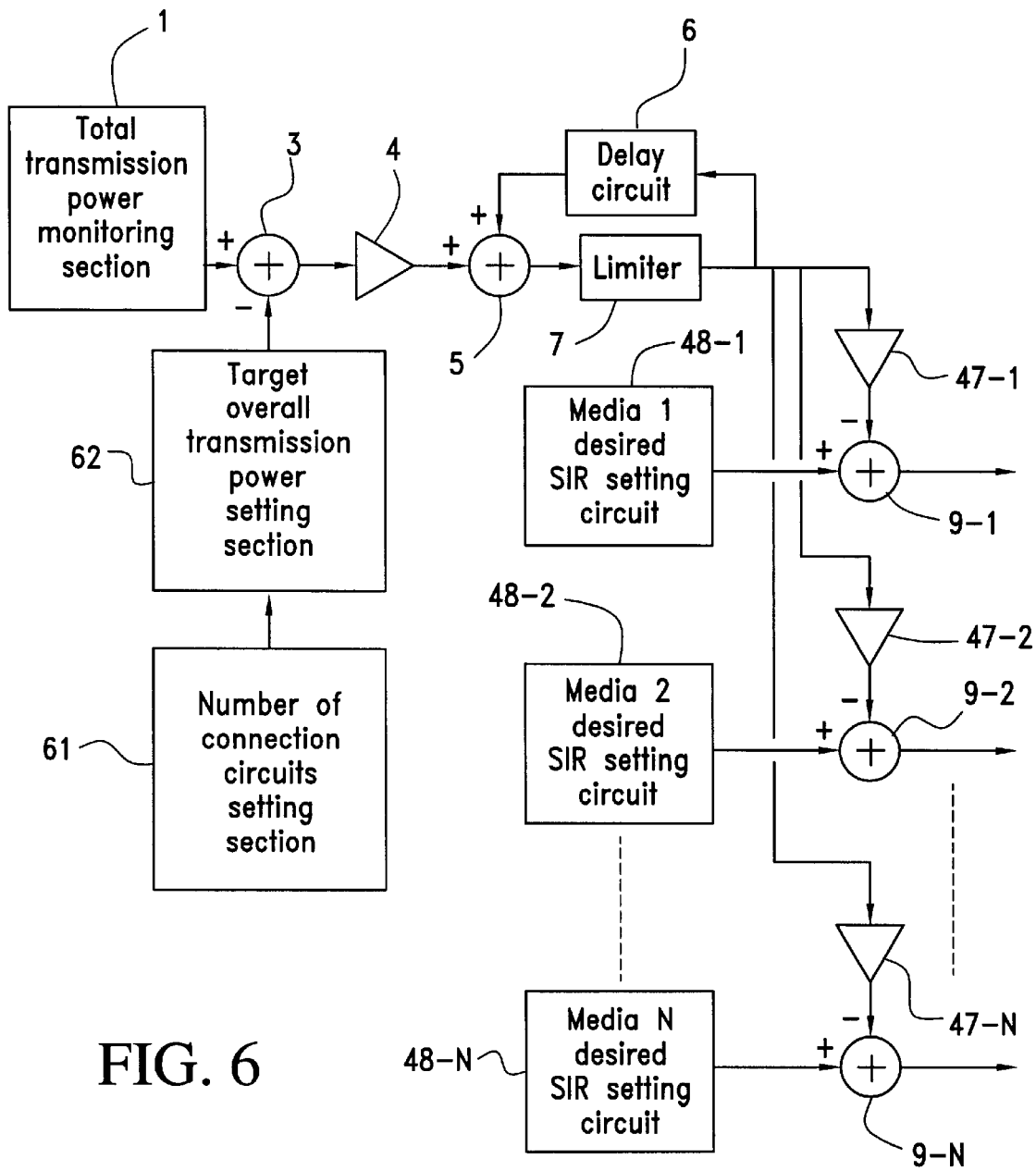
FIG. 6 is a block diagram of a fourth embodiment of a transmission power control device.

FIG. 6 is a block diagram of a fourth embodiment of a transmission power control device.

The structure of the transmission power control device of FIG. 6 will now be described.

Description will be given only for differences from the third embodiment.

The transmission power control device of the fourth embodiment is provided with a number of connection circuits setting section 61 and a target overall transmission power calculating section 62 in place of the target total transmission power setting section 2 of the transmission power control device of the third embodiment.

The number of connection circuits setting section 61 sets a number of mobile stations belonging within the wireless area of the base station B for each media and outputs a number of mobile stations for each media. When communication is commenced between the base station B and mobile stations, since the mobile stations notify the base station B about the number of media, the base station B can count the number of mobile stations for each media together with notification of the number of media from each mobile station. By altering the measurement period, it is also possible to handle a number of actually connected circuits depending on the circumstances.

The target overall transmission power calculating section 62 receives the number of mobile stations for every media as input, updates a target overall transmission power based on the number of mobile stations for every media and outputs the updated target overall transmission power. Specifically, if the reference transmission power for media k is made Pk, the media k desired SIR is made SIRk and the number of base stations for media k input by the number of connection circuits setting section 61 is made Nk, then the target overall transmission power calculating section 62 calculates target total transmission power using the following equation. The target overall transmission power calculating section 62 outputs the target total transmission power as setting signal Z.

$$\text{Target Total Transmission Power} = \sum_{i=1}^{i=N} P1 * \frac{SIR_i}{SIR1} * N_i$$

The remaining structure is the same as that of the third embodiment.

The operation of the transmission power control device of FIG. 6 will now be described.

The total transmission power monitoring section 1 monitors the total transmission power of the transmission signals to all mobile stations within the wireless area of base station B. The total transmission power monitoring section 1 outputs an average transmission power value in measurement period T as monitor signal Y for every measurement period T.

The number of connection circuits setting section 61 measures the number of mobile stations for every media, and outputs the number to the target overall transmission power calculating section 62.

The target overall transmission power calculating section 62 determines a total transmission power value based on the number of mobile stations and that total transmission power as setting signal Z.

The adder 3 subtracts setting signal Z from monitor signal Y.

The rest of the operation is the same as in the third embodiment.

According to the fourth embodiment, since the target total transmission is varied according to the number of circuits for each media, it is possible to suppress total transmission power when there are only a few communication circuits. As a result, influence on adjacent base stations can be reduced.

Fifth Embodiment

A fifth embodiment of a transmission power control device of the present invention will now be described. In the transmission power control device of the fifth embodiment, a sum total target value of media transmission power is determined for every media. The transmission power control device of the fifth embodiment will be described as used in a base station C.

Figure 7:
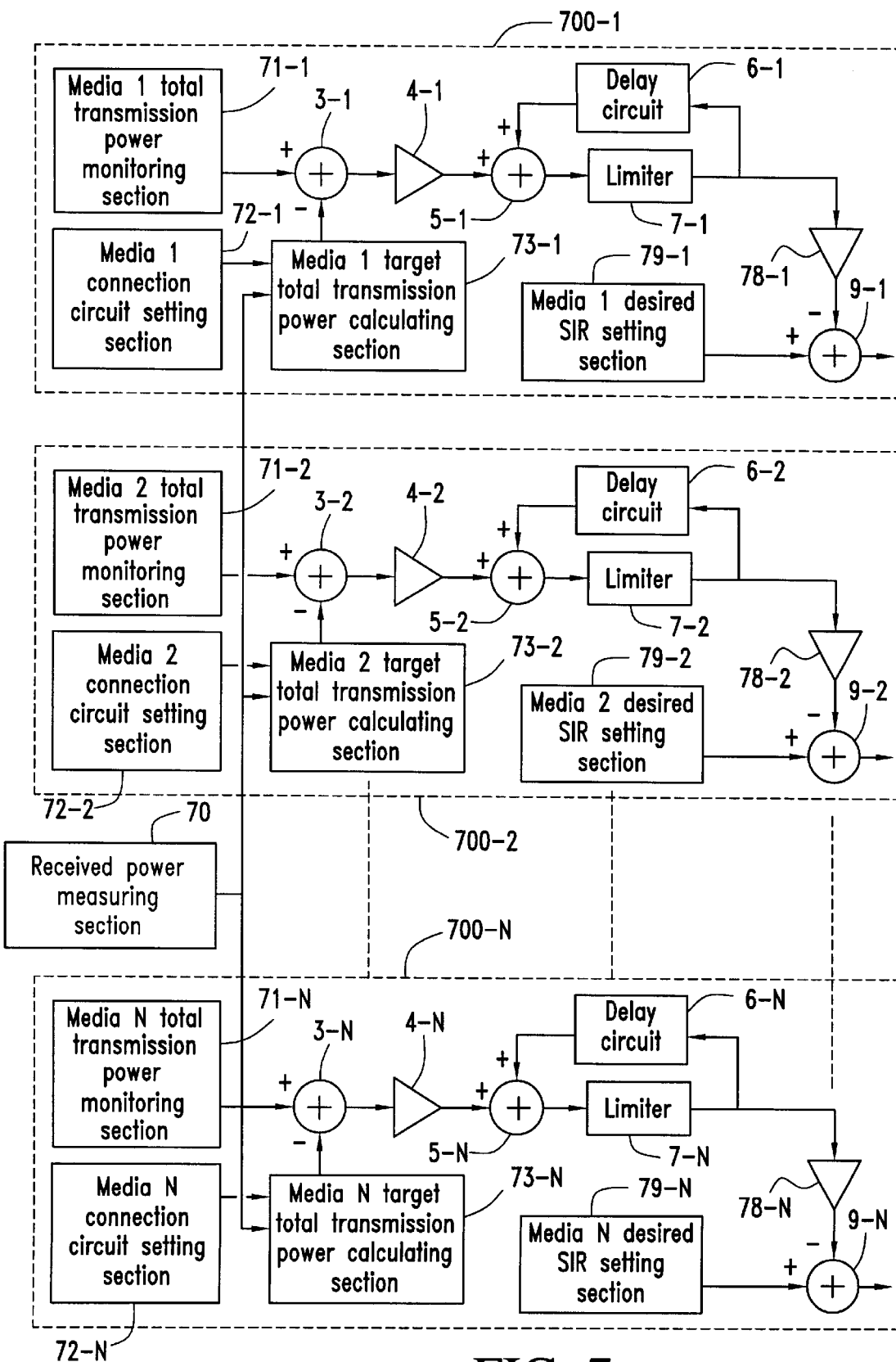
FIG. 7 is a block diagram of a fifth embodiment of a transmission power control device.

FIG. 7 is a block diagram of a fifth embodiment of a transmission power control device.

The structure of the transmission power control device of FIG. 7 will now be described.

The transmission power control device of FIG. 7 comprises a receive power measurement section 70, and new target SIR calculating sections, namely media 1 new target SIR calculating section 700-1~media N new target SIR calculating section 700-N. N is the number of types of media.

The receive power measurement section 70 measures the receive power of base station C per circuit for communicating with each media, multiplys the measured power by an area coefficient, and supplies output as media k reference transmission power for every media (k=1~N). The media k reference transmission power is the minimum transmission power required for communication using media k between the base station C and mobile stations within the boundary of the wireless area of the base station C. The area coefficient is decided according to size of the wireless area of the base station C. The receive power value of base station C is controlled to be the minimum power required for communication. So, the reference transmission power is able to be determined multipling the receive power value by the area coefficient.

A media k new target SIR calculating section 700-k (k=1~N) is comprised of a media k total transmission power monitoring section 71-k, a media k connection circuit setting section 72-k, a media k target total transmission power calculating section 73-k, a multiplier 4-k, an adder 5-k, a delay circuit 6-k, a limiter 7-k, a multiplier 78-k and a media k desired SIR setting section 79-k.

The adder 3-k, adder 5-k, delay circuit 6-k limiter 7-k and adder 9-k are respectively the same as the adder 3, adder 5, delay circuit 6, limiter 7 and adder 9 used in the transmission power control device of the first~fourth embodiments.

The media k total transmission power monitoring section 71-k monitors the sum total of transmission power to all mobile stations handling media k within the wireless area of base station C provided with the transmission power control device, and supplies output as monitor signal Y-k.

The media k connection circuit setting section 72-k measures and outputs the number of media k circuits in communication.

The media k target total transmission power calculating section 73-k outputs a sum total value of transmission power to all mobile stations handling media k as setting signal Z-k.

The setting signal Z-k is determined by the product of media k reference transmission power and the number of media k circuits communicating with the base station C.

The multiplier 78-k and media k desired SIR setting section 79-k are respectively the same as the multiplier 47-k and media k desired setting section 48-k used in the transmission power control device of the third embodiment.

The operation of the transmission power control device of FIG. 7 will now be described.

The media k total transmission power monitoring section 71-k outputs monitor signal Y-k.

The receive power measurement section 70 measures the receive power of base station C per circuit for communicating with each media, and supplies a product of the output and the area coefficient as media k reference transmission power, for every media (k=1~N). The media k reference transmission power is input to media k target total transmission power calculating section 73-k of the corresponding media knew target SIR calculating section 700-k.

The media k connection circuit setting section 72-k measures and outputs the number of media k circuits in communication.

The media k target total transmission power calculating section 73-k multiplies the media k reference transmission power that has been input from the receive power measurement section 70 and the number of k media circuits in communication that has been input from the media k connection circuit setting section 72-k, and outputs a setting signal Z-k.

The adder 3-k subtracts setting signal Z-k from the monitor signal Y-k.

The multiplier 4-k multiplies the output of adders 3-k by k times and outputs the result at time t to the adder 5-k as a change amount ΔX-k(t).

The adder 5-k adds together the change amount ΔX-k(t) and an update amount U~k (t–T) for one measurement period before that has been input from the delay circuit 6-k. The result of addition is output to the limiter 7-k as an accumulative value X~k. The limiter 7-k carries out limiting on the accumulative value X to satisfy the following condition Lower limit X1 ≤ accumulative value X-k ≤ upper limit value X2 and supplies output to the multiplier 78-k and delay circuit 6-k as a current update amount U-k (t).

The update amount U-k (t) that has been input to the delay circuit 6-k is delayed by one measurement period T and output to the adder 5-k. That is, the update amount U-k (t) is added to a change amount ΔX-k (t+T) after one measurement period by the adder 5-k one measurement period later.

The update amount U-k(t) input to the multiplier 78-k is multiplied by bk times and output. The output from the multiplier 78-k is subtracted from the media k SIR by respective adder 9-k. The subtraction result is output by the respective adder 9-k as new target SIR αk. New target SIR αk is transmitted to mobile stations currently in communication with base station B and handling media k.

According to the fifth embodiment, values subtracted from the media 1 SIR~media N SIR are set smaller for more important media by using the multipliers 78-1~78-N. That is, by not lowering a target SIR for an important media but lowering the target SIR for unimportant media, the transmission quality of important media is maintained. Also, since the setting signals Z-k are calculated for every media, the transmission and reception quality can be further maintained for important media.

The following effects can be obtained from all embodiments of the transmission power control device of the present invention as described above.

When the total transmission power of a base station becomes larger than a target total transmission power, a new target SIR for the mobile can be updated according to the difference in transmission power. As a result, even when the number of mobile stations is increased and interference power becomes large, deterioration in the communication quality for all of the mobile stations in the same way can be prevented. Further, there is an upper limit for the mobile station SIR and unlimited increase in the transmission power can be prevented, which means that the effect of interference power encroaching into wireless service areas of adjacent base stations can be suppressed.

Still further, in the third embodiment, since it is possible to carry out updating of target SIR for every media, the total transmission power for the base station is kept below a target total transmission power, and quality degradation can be prevented for important media.

Also, in the fourth and fifth embodiments, since target total transmission power can be updated based on the actual number of connection circuits to a base station, it becomes possible to control target SIR much more efficiently. Particularly, when the number of mobile stations connected is few it is possible to keep total transmission power small, which means that the effect on adjacent base stations can be kept to a minimum.

What is claimed is:

1. A transmission power control device comprising:
   a total transmission power monitoring section for monitoring a total output power value being transmitted by a base station to a plurality of mobile stations, and outputting the power value as a monitor signal;
   a target total transmission power setting section for calculating a total transmission power value appropriate for the base station and outputting the power value as a setting signal; and
   a reference update amount calculating section for calculating a reference update amount from a difference between the monitor signal and the setting signal, and outputting the reference update amount, wherein
      the reference update amount is used to update a target value of a signal-interference power ratio for the plurality of mobile stations.

2. A transmission power control device comprising:
   a total transmission power monitoring section for monitoring a sum total of transmission signal power and outputting a first total transmission power value;
   a first adder for subtracting a second total transmission power value appropriate for a base station from the first total transmission power value and outputting the result;
   a multiplier for multiplying output of the first adder by a fixed number and outputting the result;
   a second adder for adding output of the multiplier to a reference update amount a fixed time before and outputting the result as the reference update amount;
   a delay circuit for delaying the reference update amount by the fixed time and outputting to the first adder; and
   a third adder for subtracting the reference update amount from an initial value of a target value for a signal-interference power ratio of a plurality of mobile stations and outputting a new target value for the signal-interference power ratio.

3. The transmission power control device as disclosed in claim 2 further comprising a limiter for making the reference update amount a first threshold value when the output of the second adder is smaller than the first threshold value, making the reference update amount a second threshold value, that is larger than the first threshold value, when the output of the second adder is larger than the second threshold value, or making the reference update amount the output of the second adder when the output of the second adder is larger than the first threshold value but smaller than the second threshold value, and outputting the reference update amount to the third adder and the delay circuit.

4. A transmission power control device comprising:
   a total transmission power monitoring section for monitoring a sum total of transmission signal output power and outputting a first total transmission power value;
   a comparator, internally holding a fixed positive number and a fixed negative number, for comparing a second total transmission power value appropriate for a base station and the first total transmission power value and outputting the fixed positive number when the second total transmission power value is smaller than the first total transmission power value, or outputting the fixed negative number when the second total transmission power value is larger than the first total transmission power value;
   a first adder for adding output from the comparator and a reference update amount a fixed time before, and outputting the result as an accumulative value;
   a limiter, receiving the accumulative value as input, and making the reference update amount a first threshold value when the accumulative value is smaller than the first threshold value, making the reference update amount a second threshold value when the accumulative value is larger than the second threshold value that is larger than the first threshold value, or making the reference update amount the accumulative value when the accumulative value is larger than the first threshold value but smaller than the second threshold value, and outputting the reference update amount;
   a delay circuit for delaying the reference update amount by the fixed time and outputting to the first adder; and
   a second adder for subtracting the reference update amount from an initial value of target signal-interference power ratio value for each mobile station and outputting a new target signal-interference power ration value.

5. A transmission power control device comprising:
   a total transmission power monitoring section for monitoring a sum total of transmission signal output power and outputting a first total transmission power value;
   a first adder for subtracting a second total transmission power value appropriate for a base station from the first total transmission power value and outputting the result;
   a first multiplier for multiplying output of the first adder by a fixed number and outputting the result;
   a first adder for adding together output from the first multiplier and a reference update amount a fixed time before, and outputting the result as an accumulative value;
   a limiter, receiving the accumulative value as input, and making the reference update amount a first threshold value when the accumulative value is smaller than the first threshold value, making the reference update amount a second threshold value, that is larger than the first threshold value, when the accumulative value is larger than the second threshold value, or making the reference update amount the accumulative value when the accumulative value is larger than the first threshold value but smaller than the second threshold value, and outputting the reference update amount;

a delay circuit for delaying the reference update amount by the fixed time and outputting to the first adder; and new target value setting sections, the same in number as a number of media types, being input with the reference update amount, for respectively outputting new signal-interference power ratio target values for transmission signals of corresponding media, wherein the new target value setting sections comprise a second multiplier for multiplying the reference update amount by a priority coefficient and outputting the result, and a third adder for subtracting output of the second multiplier from an initial value of signal-interference target value for transmission signals of corresponding media, the priority coefficient being a value larger than 0 but less than 1 and tending towards 0 for important media.

6. The transmission power control device as disclosed in claim 5, wherein the second. total transmission power value is a value obtained by multiplying a total number of connection circuits between the base station and each of the mobile stations and the reference transmission power of the base station.

7. A transmission power control device comprising:

new target value setting sections, the same in number as a number of media types, for respectively outputting new signal-interference power ratio target values for transmission signals of respective media; and a received power measuring section for measuring received power per one circuit of each media and outputting the receive power of one circuit of corresponding media to the new target setting sections for each media, wherein;

each of the new target value setting sections comprises, a total transmission power monitoring section for monitoring a sum total of transmission signal power for corresponding media and outputting a total transmission power output, a target total transmission power setting section for multiplying a total number connection circuits of corresponding media between a base station and each mobile station, and outputting the result, a first adder for subtracting output of the target total transmission power setting section from the total transmission power value and outputting the result, a first multiplier for multiplying output of the first adder by a fixed number and outputting the result, a second adder for adding together output of the first multiplier and a reference update amount a fixed time before, and outputting as an accumulative value, a limiter, receiving the accumulative value as input, and making the reference update amount a first threshold value when the accumulative value is smaller than the first threshold value, making the reference update amount a second threshold value, that is larger than the first threshold value, when the accumulative value is larger than the second threshold value, or making the reference update amount the accumulative value when the accumulative value is larger than the first threshold value but smaller than the second threshold value, and outputting the reference update amount;

a delay circuit for delaying the reference update amount by the fixed time and outputting to the first adder;

second multiplier for multiplying the reference update amount by a priority coefficient, and a third adder for subtracting output of the second adder from an initial value of signal-interference power ratio target value for transmission signals of corresponding media, the priority coefficient being a value larger than 0 but less than 1 and tending towards 0 for important media.

* * * * *